United States Patent [19]

Hardin

[11] Patent Number: 4,756,249

[45] Date of Patent: Jul. 12, 1988

[54] SELF-ADJUSTING MEANS FOR ROLLERS

[76] Inventor: Philip J. Hardin, 850 Park La., Elm Grove, Wis. 53122

[21] Appl. No.: 942,550

[22] Filed: Dec. 16, 1986

[51] Int. Cl.$^4$ .......... B41F 1/46; B60B 9/04

[52] U.S. Cl. .......... 101/348; 29/126; 29/116.1; 101/376; 384/215

[58] Field of Search .......... 101/348, 376; 29/116 R, 29/126, 123, 114; 384/215

[56] References Cited

U.S. PATENT DOCUMENTS

| | | | |
|---|---|---|---|
| 503,928 | 8/1893 | Fisher | 29/126 |
| 635,279 | 10/1899 | Corbin | 29/123 |
| 1,189,611 | 7/1916 | Morse | 29/126 |
| 1,233,064 | 7/1917 | Kretzschman | 29/126 |
| 2,109,468 | 3/1938 | Conant | 29/126 |
| 2,185,342 | 1/1940 | Keller | 29/126 |
| 2,488,879 | 11/1949 | Pichette | 29/126 |
| 2,936,141 | 5/1960 | Rapata | 384/215 |
| 3,303,779 | 2/1967 | Giori | 101/376 |
| 3,622,059 | 11/1971 | Savela | 101/348 |
| 3,968,747 | 7/1976 | Johnson | 29/126 |

FOREIGN PATENT DOCUMENTS

| | | | |
|---|---|---|---|
| 2078172 | 1/1982 | United Kingdom | 101/348 |

*Primary Examiner*—Clyde I. Coughenour

*Attorney, Agent, or Firm*—Fuller, Puerner & Hohenfeldt

[57] ABSTRACT

A cylindrical ink roller rotates as a result of being in tangential line contact with an adjacent roller that is driven rotationally. The roller is suspended for rotation and axial oscillation on bearing cages including bushing for turning and sliding on the shaft. A plurality of springy curved steel wire ribs have corresponding one ends fastened to the bushing and the ribs extend axially for their corresponding opposite ends to fasten to a ring member which fits inside of the roller. The ribs flex or bend slightly to allow the roller to be forced into perfect parallelism with the adjacent roller. The open ribbed roller suspension cages afford free flow of air axially through the roller for cooling it. One or more fans can be installed in the roller. A mechanism for oscillating the roller axially is confined inside of the roller and so designed that cooling air can flow past it.

3 Claims, 4 Drawing Sheets

SELF-ADJUSTING MEANS FOR ROLLERS

BACKGROUND OF THE INVENTION

The invention disclosed herein relates to journaling machine parts for rotation and, by way of example but not exclusively, to rollers that are used in the inkers of printing presses and in machines for applying a thin coating on a web or sheet of material such as paper. Particularly, the invention is exemplified in providing tangentially contacting rollers with means for supporting the rollers for rotation and performing the additional functions of allowing the rollers to automatically adjust into perfect alignment with each other and also provide a path for forcing cooling air through the interior of the roller.

The rollers most widely used in the inkers of high speed printing presses, such as offset printing presses, have traditionally been formed of a solid metal cylinder having shafts extending from opposite ends so the rollers can be connected to means for driving them rotationally. One roller picks up ink from an ink reservoir and then there is a roller to roller transfer until the ink is finally coated on a rotating photolithographic plate. In the most commonly used inkers, means are provided for oscillating at least some of the tangentially contacting rollers axially in an effort to obtain more uniform distribution of ink on the rollers and, hence, on the printing plates. As is well known, ghosting or residual imaging of the printed material is a consequence of non-uniform distribution of the ink on the rollers that contact the image plates. Conventional presses use various mechanisms such as wobble plates and cams for oscillating certain of the rollers axially. Conventional oscillating mechanisms are bulky and have several moving parts which are subject to wear and other defects that are well known to those involved in the printing industry.

One of the problems that has not been solved satisfactorily until the invention described herein was made is the problem of getting the periphery of the tangentially contacting oscillating and non-oscillating rollers to contact each other uniformly along their entire lengths. Obtaining uniform contact of all the rollers in the inker when the press is being assembled for the first time is problematical in itself, but maintaining uniform line contact when the press is in operation is even more difficult because of thermal distortions. In high speed presses, the solid ink rollers become very hot because of friction between rollers which results from some of the rollers being driven rotationally and others being turned by frictional contact with those that are driven. When the solid rollers become hot, they have a tendency to warp or bow and assume different diameters along their length because of thermal expansion and warpage. This tends to make ink distribution on the rollers non-uniform. A possibly worse consequence is that the ink cannot be maintained at the proper viscosity. The ink gets thinner and thinner as the roller temperature increases. As the ink thins, the water vapor that is sprayed on the photolithographic image plates tends to emulsify the ink. The action of the ink on the plates then is such that areas that ought to print with a good solid color become mottled and ghosty. This reduction in printing quality can be discerned even by a layman who does not have the sensitivity to quality of an experienced printing press operator.

Some of the rollers in the inker of a high speed printing press will have a coating or outer sleeve composed of an elastomeric material such as rubber. When presses are run at near or above their ostensible rated speed, the heat generated in the roller is sometimes great enough to soften the rubber sleeve to the extent that it is bulged or expelled centrifugally from the underlying cylindrical metal roller. This, of course, requires shutting down the press and replacing the rollers.

Sometimes when presses are being stressed to their speed limit, air hoses or fans are set up to try to blow air over the rollers in the inker for cooling them to the extent possible. Pumping refrigerated water through certain of the rollers in an inker has also been tried. Adequate cooling has never been achieved by any of these practices.

U.S. Pat. No. 4,509,426, dated Apr. 9, 1985, discloses an oscillating roller wherein the oscillating mechanism is installed within the roller cylinder itself. This patent is owned by the inventor of the invention described herein. Its entire disclosure is incorporated herein by reference. An improved axially reversing roller for printing presses and sheet coating machines is also described in pending U.S. patent application Ser. No. 892,901, filed Aug. 4, 1986. The entire disclosure of this patent is also incorporated herein by reference.

The axially oscillating or reversing rollers described in these patents are not solid rollers, but are comprised of tubular cylinders of metal or plastic which are journaled for rotating and reciprocating axially on a fixed shaft. There is a cylindrical element fixed internally and coaxially of the roller cylinder. This element has an internal left hand thread contiguous with a right hand thread or helix. The roller is driven rotationally as a result of being in tangential contact with a rotationally driven roller. Axially spaced apart plungers having threaded followers are mounted on the stationary shaft within each of the internally threaded members. There is a left hand thread engaging follower on one plunger and a right hand thread engaging follower on the other. They are interlocked so that when one is driven into engagement with one internal thread, the other is forcibly disengaged from the cooperating internal thread. Thus, as the roller rotates with one thread follower engaged, the roller will shift axially. When it reaches a pre-determined limit, the striker element causes the engaged follower to become disengaged and the previously disengaged follower to become engaged with the thread of opposite twist so that the roller reverses and shifts axially in the opposite direction.

The axially oscillating roller just described in general terms is meritorious in that the oscillating mechanism is built in and requires no external drive other than the driving force from a driven tangentially contacting roller. For this and other reasons it became highly regarded in the printing industry quickly. The fact that it provides for greater axial travel in both directions as compared with the prior art oscillating mechanisms has been a significant factor in getting good ink distribution and, as a result, eliminating ghosting. The roller can easily be installed in existing presses to replace oscillating rollers and dispense with the usual complex oscillating mechanism. They can be substituted for solid non-oscillating rollers in inkers so that there are more oscillating rollers in the inker. This improves ink distribution. Most advantageous of all, the oscillating roller has permitted running the presses at much higher speeds than were heretofore permissible without increasing ghosting. Regardless of the better quality printing and higher productivity achieved with the new oscillating rollers, heating of the rollers due to friction still is a major factor in determining the maximum speed at which a press may be run.

SUMMARY OF THE INVENTION

A feature of the present invention is to induce tangentially contacting ink rollers of either the axially oscillating type or non-oscillating type to self-adjust into perfect continuous line contact with each other so as to bring about more uniform distribution of ink on the rollers and avoid the development of those high compressive stress lines which result in excessive heating.

Another feature is to provide roller mounting and journaling means that not only achieve the self-aligning feature just mentioned but, in addition, facilitate forcing cooling air through them.

Another feature of the invention is to simplify the roller oscillating mechanism and permit relocating it near an end of the roller instead of near the center inside of the roller as has been the practice heretofore. An adjunct to this feature is that the oscillating mechanism can be accessed easily for inspection or replacement because of the manner in which the previously mentioned mounting and journaling means of the roller can be removed to permit access to the oscillating mechanism.

A basic objective of the invention is to provide a bearing structure which is one form journals rotating machine parts such as gears and rollers for rotation on a fixed shaft while providing flexibility that allows the axis of the part to float into perfect parallelism with the axis of the gear or roller, respectively, with which the part is meshed or frictionally engaged. An alternative form of the new bearing structure provides for achieving alignment between rotating machine parts such as gears and ink rollers in applications where the shaft is rotating in dedicated bearings and the new bearing structure is the intermediary for flexibly coupling the machine part to the shaft.

Briefly stated, in accordance with one illustrative application of the invention, the ink roller is comprised of a metal or plastic tube or cylinder which may have a sleeve or coating of elastomeric material on it. The roller turns with respect to a stationary shaft that extends through the roller. The new roller mounting means comprises, in one embodiment, a bearing such as a bushing which is journaled on the stationary shaft. A plurality of wire ribs extend axially from the bushing and are terminated in a ring which fits inside of the roller tube or cylinder and is spaced axially from the bushing. The wires are springy and together form what can be called a cage that allows the roller to float and adjust into uniform tangential line contact with an adjacent roller. The bearing and mounting cages, being open, provide a clear path for the flow of cooling air through the interior of the rollers. The oscillating mechanism is also designed so that it has adequate spaces around it for permitting air to flow through the roller.

An alternative application of the cage will also be described wherein a shaft is driven rotationally and the cage is connected between a roller, gear or other machine part and the shaft so the part is supported for floating into alignment with an adjacent part while rotating with rather than on the shaft.

How the oscillating mechanism has been modified and how the roller mounting means and bearing cages are constructed and located for self-alignment of the rollers and how these elements are constructed for letting cooling air pass through the rollers will be evident in the ensuing description of illustrative embodiments of the invention which will now be set forth in reference to the drawings.

DESCRIPTION OF A PREFERRED EMBODIMENT

Figure 1:
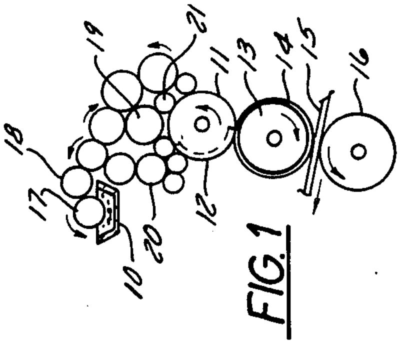
FIG. 1 is a diagram including a simplified form of inker comprised of ink transfer rollers, an image plate supporting cylinder, a blanket cylinder, and an impression cylinder which comprise a typical offset printing press and in which inker one or more of the improved axially oscillating ink rollers may be used.

FIG. 1 is a diagram that is illustrative of the arrangement of rollers in an inker for transferring viscous ink from a reservior 10 to a printing plate cylinder 11 in one color stage of an offset printing press. A photolithographic plate that is mounted on cylinder 11 is depicted in dashed lines and marked 12. The objective of the invention is to assure that a thin uniform film of ink is applied to the active printing areas on image plate 12. As is well known, the active surface of the image plate 12 has areas that attract moisture and repel ink and other areas that repel moisture and attract ink. The means for applying a film of moisture on the image plate are not shown. The blanket cylinder 13 of the press is contiguous with the plate cylinder 11 and its periphery is encased in a rubber sleeve or mat as is typical of offset printing presses. As cylinders 11 and 13 rotate, image plate 12 periodically makes an impression on the outer surface of mat 14 and this impression is transferred to the top of paper web 15 which is passing through the press at high speed while the web is pressed against the blanket cylinder by an impression roller 16.

In FIG. 1, as is typical in offset printing presses, a plurality of rollers whose peripheries are in tangential contact with each other are used to transfer the viscous and greasy ink from ink reservoir 10 to the printing plate 12. The first roller in the series is the ink pickup roller 17 which, as a result of rotating in the ink reservoir 10, becomes coated with ink. Most of the ink is squeezed off by a swinging ductor roller 18 which is thereby coated with a film of ink. A thin coating of ink is, of course, deposited on the next roller 19 which brings about an exchange of ink with other rollers until the ink arrives at image plate cylinder 11. Selected ones of the ink rollers are oscillated axially as they roll on the roller in which they are in contact. The self-contained mechanism for axially oscillating the rollers may be incorporated in rollers 19 and 20, for example. A form roller 21, that is, a roller that transfers ink directly to image plate 12 may also be oscillating.

Figure 2:
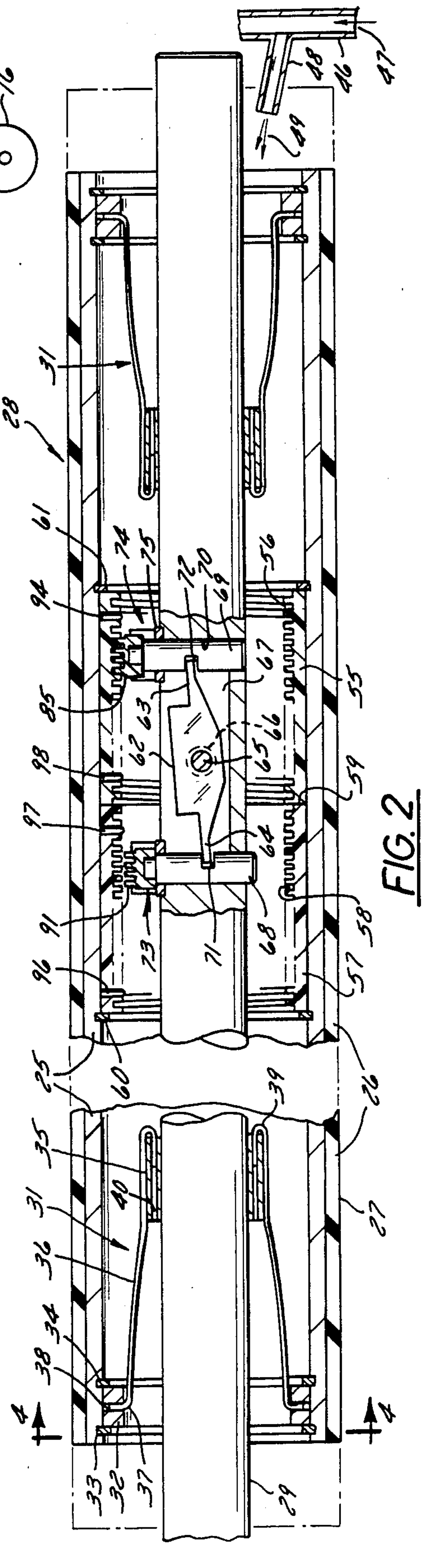
FIG. 2 is a vertical longitudinally extending section of an axially oscillating ink roller that incorporates the new cage means for accomplishing self-alignment and cooling.
Figure 3:
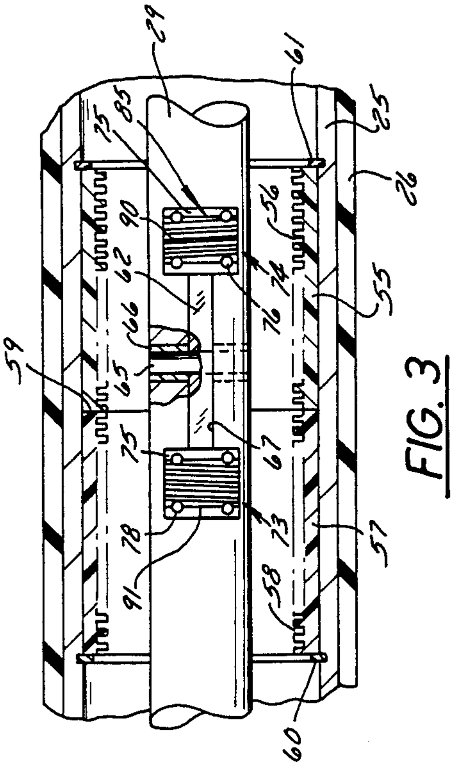
FIG. 3 is a fragmentary plan view, partly in section, of the modified automatic roller oscillating mechanism depicted in the FIG. 2 embodiment.

Attention is not invited to FIGS. 2–5 for a discussion of the new means for mounting an ink roller or any other type of roller that is used for distributing a film of coating material. In accordance with the invention, the roller is provided with a bearing cage that enables the roller to make uniform tangential contact along the length of an adjacent roller and provides for cooling the roller. Considering FIG. 2, the roller is comprised of a hollow cylinder 25 of metal or other rigid material. The depicted model has a sleeve 26 of elastomeric material bonded to it. The ink film, of course, is formed on the peripheral surface 27 of sleeve 26. The ink film is developed directly on the periphery of metal cylinder 25 when the roller has no elastomeric sleeve 26. The fact that the roller in FIG. 2 is provided with a mechanism for oscillating axially may be disregarded for a moment. Attention is focused first on the manner in which the roller is mounted for rotation and on how the mounting means are adapted for facilitating self-adjustment and air cooling of the roller.

Figure 5:
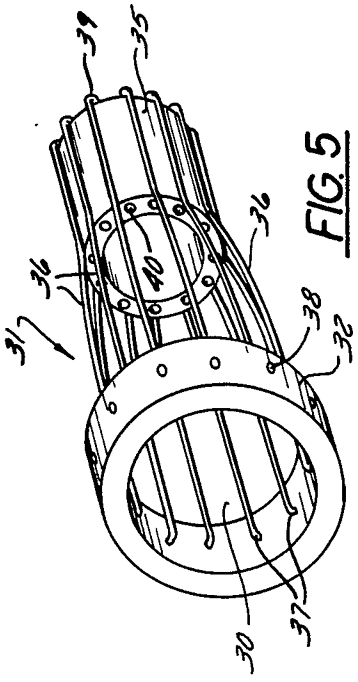
FIG. 5 is a perspective view of one embodiment of a bearing cage that is adapted for effective self-alignment of adjacent rollers and for permitting circulation of cooling air through the inside of the roller.

In the FIG. 2 embodiment, the roller, which is generally designated by the reference numeral 28, rotates on a stationary shaft 29 that would be fastened to the frame of the printing press, not shown, and would span across substantially the width of the press. Uniform tangential line contact of the peripheral surface 27 of the depicted roller with a corresponding surface on an adjacent roller is achieved with the two new self-aligning bearing structures, two of which are generally designated by the reference numeral 31 in FIG. 2. One embodiment of the bearing stucture isolated from FIG. 2 is also shown in FIG. 5. The bearing structure is appropriately called a bearing cage. It comprises an annular ring 32 which fits snugly into the bore of metal roller cylinder 25. As shown in FIG. 2, for example, ring 32 of the bearing cage is retained in the roller cylinder 25 by means of split snap rings 33 and 34 which reside in corresponding grooves in the metal roller cylinder. The cage 31 has a bearing in the form of a bushing 35 for running rotationally and sliding reversibly in opposite axial directions on stationary shaft 29. The roller cylinder 25 is supported from the bushing 35 by means of a plurality of axially extending circumferentially spaced apart curved spring wires or ribs such as the one marked 36. These ribs are equiangularly arranged around the bushing 35 and annular ring 32. The ribs 36 can be curved convexly or radially outwardly as shown or concavely or radially inwardly. In this particular model of of the cage corresponding ends of the wire ribs remote from the bushing have a right angular bend 37 which fits the end into radially extending holes 38 in ring 32 of the bearing cage. Thus, the ring constitutes a suitable anchoring means for corresponding ends of the ribs. Opposite ends of each rib 36 is formed with a reentrant bend 39 which passes through one of the axially extending holes 40 in bushing 35 as can be seen clearly in FIG. 5. In an alternative type of cage, not shown, the ends of the wire ribs pass directly into the axial holes in the bushing 35. The bushing is then put on a mandrel having the diameter of shaft 29 and the bushing is staked along the lines of the wire ends to secure the wire ribs soundly in the bushing. Thus, the roller is supported on springy ribs 36 in cantilever fashion. The bearing cage has at least two degrees of freedom axially and an unlimited number of degrees of freedom in radical directions. Hence, the roller can tilt in such fashion that its axis is at an angle relative to the axis of shaft 29. If a roller having the bearing cages 31 has its periphery pressed against another roller having a substantially parallel axis that is somewhat angulated relative to the axis of the roller, the roller having the new self-aligning suspension cages will orient its axis and, hence its periphery, to make line contact along the entire length of the adjacent roller. The wire ribs 36 for the bearing cages are preferably hard steel that will act like springs when deflected crosswise. Stiffness and load capacity of the cages are determined by the lengths of the wire ribs, the diameter of the ribs and the number of ribs.

As indicated earlier, conventional rollers have been made of solid metal cylinders with shafts extending from opposite ends for journaling the roller in bearings on the printing press, for example. This precluded circulating cooling air through the roller. In other rollers such as the one shown in applicant's cited U.S. Pat. No. 4,509,426, the roller is supported on closed disks or end caps which have central needle bearings or bushings for enabling the roller to oscillate axially and rotate on a stationary shaft but there is no essentially unobstructed air path through them. The end caps, of course, blocked the roller in such a way that coolant could not be circulated through it. Now as can be seen especially clearly in FIGS. 4 and 5 the new bearing cages 31 provide openings 30 between the spring ribs 36 to permit the flow of cooling air axially through the bearing cages and the roller itself.

The cooling device is illustrated diagrammatically in FIG. 2 and is comprised of a hollow header 46 which has a pressurized cold air inlet 47. An open ended air outlet tube or nozzle 48 extends from header 46 and projects an air stream 49 to the inside of the roller for cooling it. In a practical case, the cooling air can be derived from an outlet of an air conditioning system, not shown, which is usually present in a printing shop. A dedicated air refrigerating system, not shown, can, of course, also act as the source of cooling air for the rollers. Cooling most or all of the rollers in an inker is advisable in the highest speed presses. Presses capable of putting through a web for printing at as fast as 3,000 feet per minute are now being used in the industry but it has not been possible to run the presses at the highest speeds at which they are capable because of the ill effects of ink roller heating which were mentioned earlier. The new air cooled rollers permit running a press at speeds not heretofore permissible.

The roller suspension and bearing cages 31 just described are used advantageously in rollers that are adapted to oscillate axially while rotating as well as the rollers that only rotate. A mechanism is shown in FIGS. 2, 3, 4 and 6 for oscillating the roller axially or reciprocating it reversibly as it rotates about stationary shaft 29.

The mechanism for oscillating the ink roller axially and reversibly along stationary shaft 29 is shown installed near one end of the roller in FIG. 2. There is a plastic sleeve 55 fitted snugly into the metal roller tube 25. Cylindrical sleeve 55 has an internal thread or helical groove 56. Assume that thread 56 is a right hand thread. Another cylindrical sleeve 57 is installed in roller tube 25 axially adjacent sleeve 55. Sleeve 57 will have a thread or helical groove 58 which, in this case, would be a left hand thread. The line along which the sleeves 55 and 57 abut is marked 59. The sleeves are retained and pressed toward each other between axially spaced apart split snap rings 60 and 61 which reside in complementarily shaped annular grooves inside of metal roller cylinder 25.

There is a lever 62 having side arms 63 and 64 mounted on a pivot pin 65 in a slot 67 in shaft 29. The pivot pin 65 can turn in a bushing 66 as can be seen most clearly in FIGS. 3 and 6. The depth of slot 67 is somewhat less than the diameter of the stationary shaft 29. There are two diametrically movable plungers 68 and 69 fitted into diametrical holes in stationary shaft 29 such as the hole 70 which can be seen most easily in FIG. 6. In that figure one may see that in typical plunger 69 there is a radial slot 72. FIG. 2 shows how the tips of the lever arms 63 and 64 register in slots 72 and 71, respectively, in the plungers. It will be evident in FIG. 2 that if a force is applied to the upper end of right plunger 69 this plunger will descend and through the interlocking action of lever 62, the left plunger 68 will be forced upwardly. Likewise, when plunger 68 is forced down, plunger 69 is forced upwardly.

Figure 6:
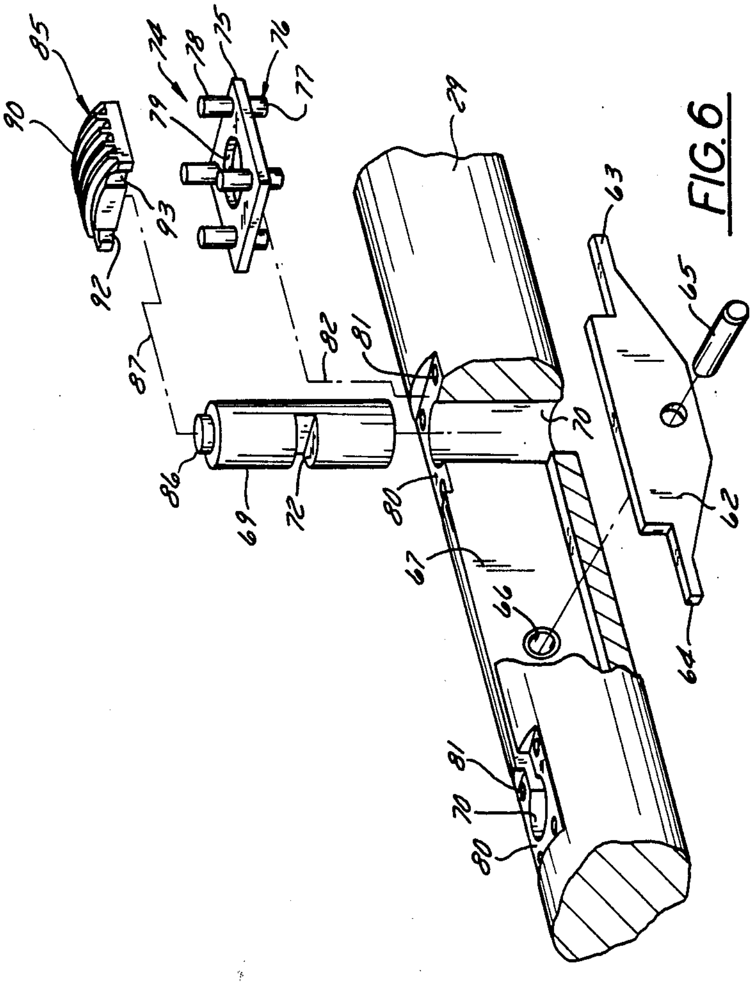
FIG. 6 is a perspective view of the improved oscillating mechanism which is installed in the roller.
Figure 4:
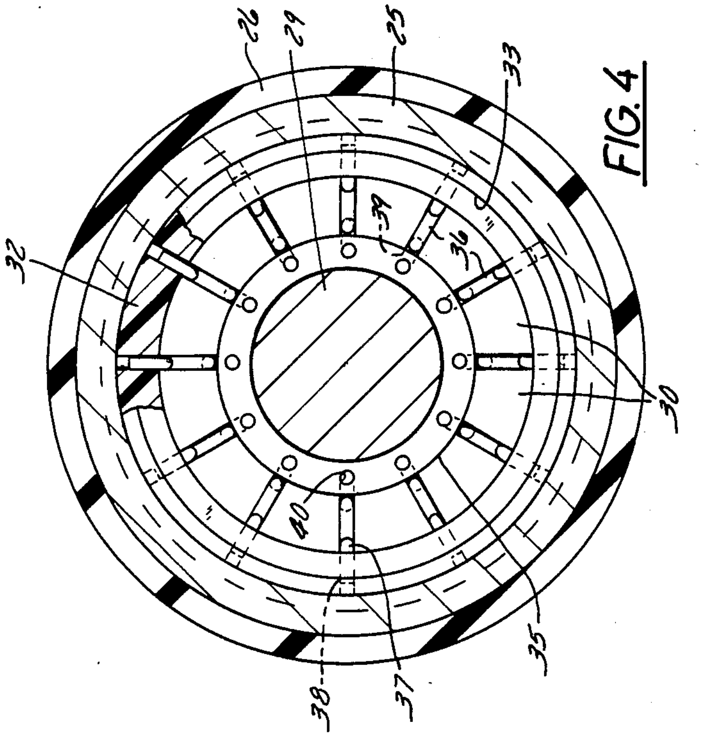
FIG. 4 is a transverse section of the roller taken on a line corresponding with 4—4 in FIG. 2.

There are left and right thread follower elements generally designated by the numerals 73 and 74 in FIG. 2. The construction of these follower elements can be seen most clearly in FIGS. 6 and 3. Referring to FIG. 6 first, typical follower element 74 is comprised of a planar base 75. This base has a plurality of guide pins, such as the one generally designated by the numeral 76, extending through it. A typical pin has a part 77 extending below the base and a part 78 extending above base plate 75. The base 75 also has a central hole 79. Shaft 29 has its periphery milled away to form a flat area marked 80 on top of the shaft. There are four holes 81 in flat area 80 of the shaft and they are arranged in correspondence with the arrangement of the four pins 76 which extend through the plate 75. When assembled as suggested by the dash-dot assembly line 82, plate 75 fits into the flat area 80 on the shaft and the lower ends 77 of the four pins 76 on the base register in holes 81, thereby anchoring the base plate 75 on the shaft. Then the plunger 69 fits through the hole 79 in the base plate and the hole 70 in the shaft. The upper parts 78 of pins 75 serve as thread follower guides as will be explained.

Still referring to FIG. 6, a follower element 85 is provided. It has a circular recess, not visible in its bottom for allowing it to be pressed onto the reduced diameter portion 86 at the upper end of plunger 69. The dash-dot assembly line 87 suggests the attachment.

The follower element 85 is basically the same as the one described in previously cited U.S. Pat. No. 4,509,426 but it has some modifications and improvements. On the top of follower element 85 there are a plurality of thread segments 90 which are not present in the issued patent. As is evident in FIG. 2, the threads on the right follower 85 are the same as the internal threads of the right internally threaded sleeve 55 in the roller as is evident in FIG. 2 where the threads on follower 85 are presently meshed in internal threads 56. In this example, threads 56 and 90 are both right hand threads. There is a similar threaded follower 91 which has a left hand thread in this example and engages in the internal left hand thread 58 in sleeve 57 within the roller as is evident in FIGS. 2 and 3. Left hand thread follower 91 is, of course, fastened to plunger 68. Typical follower 85 has four semi-circular grooves, two of which, 92 and 93, are visible in FIG. 6. There are another pair of grooves on the backside of follower 85. When the follower is assembled to the plunger 69 and the base 75 with the four guide pins 76 is installed on the stationary shaft 29, the four pins 76 serve as guides for the threaded follower and assure that the threads thereon will mesh accurately with the internal threads of the sleeve 55, for example. Note in FIGS. 2 and 3 that the oscillating mechanism comprised of the plungers and threaded followers 85 and 91 are so arranged that there is a substantial amount of space surrounding the shaft 29 for conducting cooling air lengthwise of the roller.

The operating mode of the oscillating roller will be briefly described although operation is similar to the roller in U.S. Pat. No. 4,509,426. Referring to FIG. 2, assume that the roller depicted therein is in contact with another roller that is causing the depicted roller to rotate clockwise when viewed from its right end. Right hand thread follower 85 is still engaged and since the effect is similar to the internal thread in the roller acting as a nut and a segment 85 acting as a threaded bolt, the nut will be advancing to the left when follower 85 is engaged with right hand thread 56. In FIG. 2, the roller is rotating and is nearly at its left limit. The limit is set by means of a striker pin 94 which is located at the right hand thread 56 and near its right end. A few more clockwise rotations of the roller in FIG. 2 will cause the striker pin 94 to ride up on the right most thread segment of follower 85, thereby driving the follower out of engagement with the internal thread of the sleeve. When this happens, the right plunger 69 is driven downwardly the double armed lever 62 is rotated clockwise. This causes the left plunger 68 to be driven radially upwardly so the left hand thread segments on follower 91 engage with the left hand internal threads 58 in left sleeve 57. When the threads on follower 91 engage and the roller is turning clockwise as viewed from its right end, axial motion of the rotor is opposite of what it was when the right hand thread follower 90 was engaged. This means that the rotor will now shift to its right until left striker pin 96 which is embedded in the left hand internal thread 58 reaches the left most thread segment on follower 91. This drives the left follower 91 out of engagement and the right follower 90 into engagement and the roller reverses its axial direction again.

When the roller is rotating clockwise as viewed from its right end as just discussed, striker pins 94 and 96 cause the direction switching. If the roller is turning oppositely, that is, counterclockwise as viewed from its right end, another more inward pair of strikers 97 and 98 disengage the followers from the internal threads of the sleeves.

Figure 7:
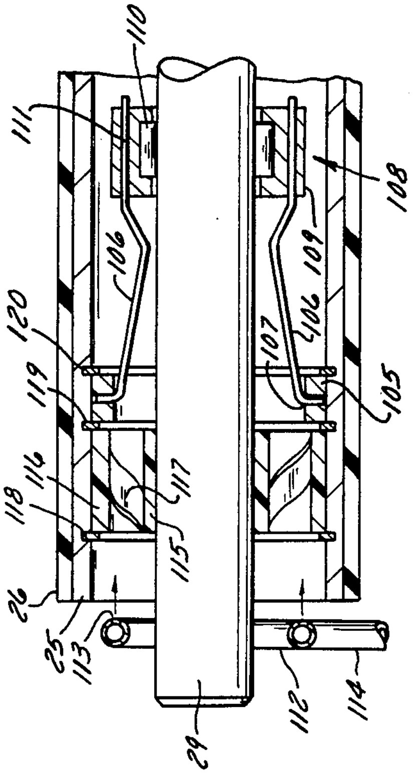
FIG. 7 is a fragmentary view of an embodiment of a roller in which there is an alternative form of bearing cage for supporting and effecting self-alignment or uniform contact of a roller with an adjacent roller and including a built-in fan for augmenting circulation of cooling air through a roller.

FIG. 7 illustrates an alternative type of bearing cage for suspending the roller in a fashion that permits its periphery to align in perfect parallelism with the periphery of an adjacent roller. In the FIG. 7 embodiment the metal roller cylinder and the elastomeric sleeve are marked 25 and 26 as they are in the previously discussed embodiment. The roller suspension cage comprises an anchoring ring 105 that fits concentrically within the bore of metal roller cylinder 25. The ring 105 is retained between snap rings 119 and 120. The wire ribs 106 of the bearing cage have bends 107 at their ends as in the previously discussed embodiment and these bent ends are sprung into radial holes in ring 105. The ribs diverge from the shaft and the ribs are generally convex inwardly toward the shaft in this example. The part of the cage that serves to journal the roller 25 on stationary shaft 29 is designated generally by the numeral 108. In this case, a needle roller bearing is used instead of a bushing to support the roller for rotation and bidirectional axial movement. The needle bearing comprises a casing 109 having an annular channel in which there are rollers 110. The casing 109 has a series of axial holes in its wall into which the ends 111 of wire ribs 106 are pressed. The bearing or roller suspension cage just discussed in reference to FIG. 7 imparts to the roller the same self-aligning characteristic as was accomplished with the cage described in connection with the FIGS. 2–5 embodiment.

In FIG. 7, the means for discharging cooling air through the roller is represented by a tubular annulus 112 in which there are a plurality of holes 113 through which cooling air is projected in a direction indicated by the adjacent arrows. A cool air feed line 114 supplies the air to annulus 112. Also in FIG. 7, a fan is shown built into the roller for augmenting the flow of air through it. The fan has inner and outer rings or sleeves 115 and 116, respectively, between which there is a circular array of fan blades 117. The fan is preferably molded of plastic in a single piece. The fan is retained between a pair of snap rings 118 and 119. Snap ring 119 also retains ring 105 of the bearing cage in position along with another snap ring 120.

Figure 8:
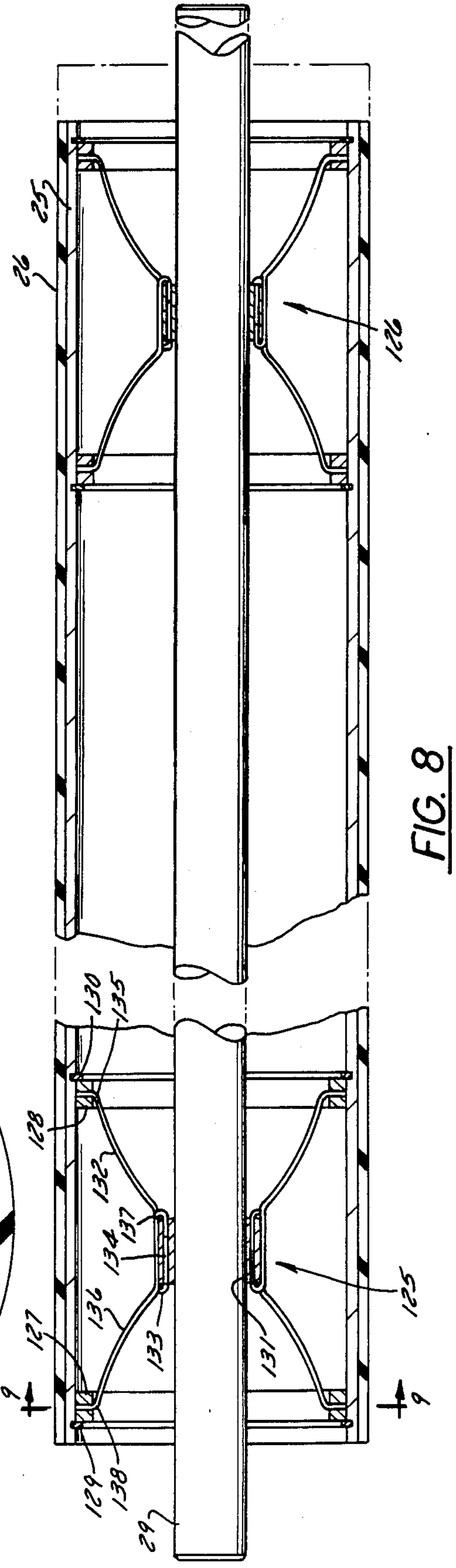
FIG. 8 is a vertical longitudinally extending section of an axially oscillating roller in which an alternative embodiment of the roller mounting and self-alignment bearing cage is used.
Figure 9:
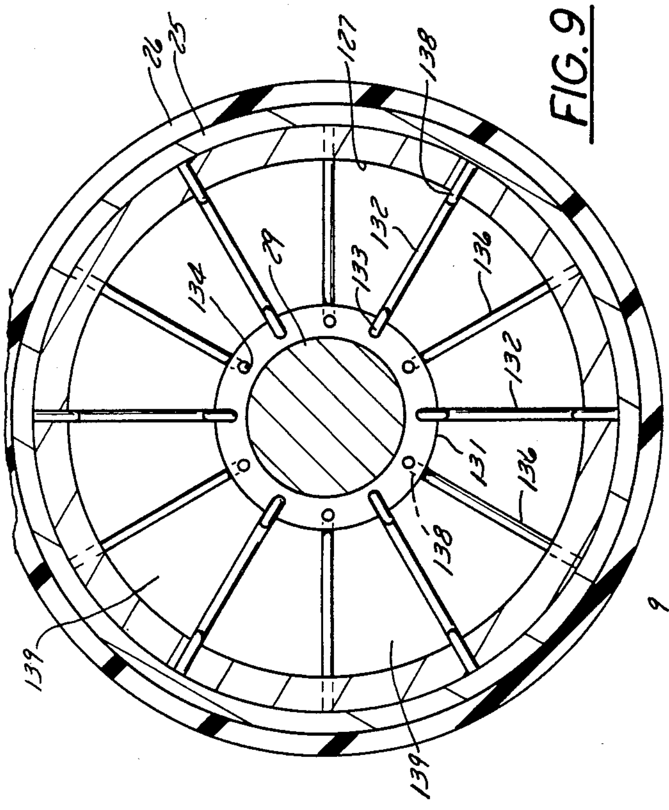
FIG. 9 is a section taken on a line corresponding to 9—9 in FIG. 8.

FIGS. 8 and 9 are presented primarily to illustrate an alternative embodiment of the self-aligning roller suspending cages that support the roller for rotation and, in some cases, also for axial translation. The left cage in FIG. 8 is indicated generally by the numeral 125 and the right cage by the numeral 126. The cages are similar. Consider the left cage. It comprises a left ring 127 and a right ring 128. The cage is retained in the inside of metal ink roller cylinder 25 by means of axially spaced apart snap rings 129 and 130. Two oppositely extending groups of ribs 132 and 136 are used in cage 125. This scheme may be better for the largest diameter rollers used in printing presses in which case a stiffer suspension is desirable. In FIG. 8, the bearing for journaling the roller on stationary shaft 29 is in the form of a bearing metal bushing 131. There are a plurality of circumferentially spaced apart suspension ribs 132 spanning between bushing 131 and annulus or ring 128. The left ends or ribs 132 are bent reentrantly as at 133 for extending through a plurality of equally spaced apart axial holes 134 in bushing 131. The other ends 135 of ribs 132 are sprung into radial holes in ring 128. There is another set of wire ribs 136 that are arranged in a circle alternately with ribs 132. Struts 136 also have reentrant bends 137 for extending through axial holes 138 in bushing 131 as can be seen clearly in FIG. 9 where ribs 136 have a bend 138 at their ends which fits through radial holes in ring 127. Note that the wire suspension ribs 132 and 136 are curved or bulged slightly radially outwardly. As is evident in FIG. 9, the bearing cage offers practically no impediment to the flow of air from one end of the roller to the other through the wide open spaces 139 between the ribs and around the central bearing 131.

The ink roller in FIGS. 8 and 9 is shown without having an axial osciallating mechanism. In an inker it is not necessary to have all of the rollers oscillate axially. It will be evident, however, that the oscillating mechanism depicted in FIGS. 2, 3 and 6 can be installed in the rigid roller cylinder 25 in the FIG. 8 embodiment as has been illustrated and explained in connection with FIGS. 2, 3 and 6.

The rollers have been described as being comprised of an inner metal, plastic or other rigid material cylinder 25 on which there is an elastomeric sleeve 26 whose periphery becomes coated with ink or whatever material that is being used to apply a coating to a sheet. It should be understood, however, that the elastomeric sleeve 26 is not ordinarily used on all rollers in an inker. Note also that the internally threaded sleeves such as sleeves 55 and 57 which are used in the oscillating mechanism depicted in FIG. 2 may composed of a low friction material such as nylon in which there is a low friction material such as molybdenum sulphide or the sleeves may be made of a bearing material such as bronze.

Figure 10:
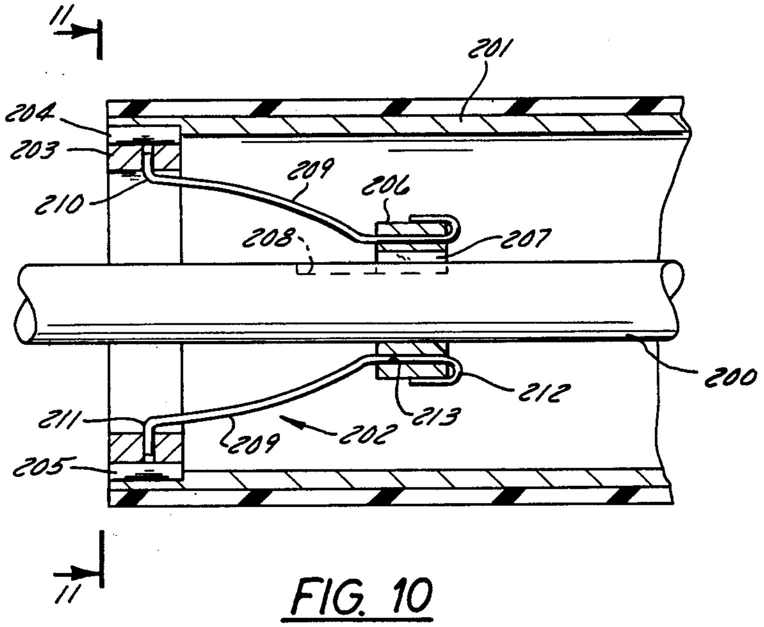
FIG. 10 is a longitudinal sectional view of an alternative application of the new rotating part mounting cage wherein a tubular cylindrical roller is coupled to a rotatably driven shaft by the cage.
Figure 11:
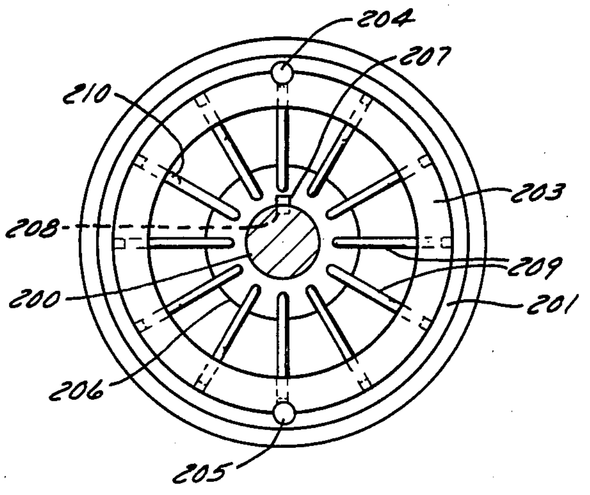
FIG. 11 is a view looking across the plane touched by the tips of the arrows 11—11 in FIG. 10.

FIG. 10 shows an application wherein the shaft 200 is driven rotationally by means which are not shown. A roller 201 is rotatable with the shaft. The roller is mounted to the shaft by way of a modified version of the rotating part flexible mounting cage which is generally designated by the numeral 202. As is evident in FIGS. 10 and 11, cage 202 is comprised of an outer ring 203 made of any suitable rigid material. The outside diameter of ring 203 is just slightly less than the inside diameter of roller cylinder 201 so the ring fits snugly into the roller. Diametrically opposite axially extending dowel pins 204 and 205 secure the ring against axial and rotational movement in cylinder 201. Ring 203 is part of a cage. Another part is a ring or bushing 206 which is driven rotationally by shaft 200 as a result of ring 206 being fixed to the shaft with a straight key 207 in this example. The key fits into a keyway 208 in the periphery of shaft 200 and, of course, the bore of bushing 206 has a corresponding keyway which is presently occupied by the key 207. As in previous embodiments, the roller is suspended from the shaft on a plurality of ribs 209. As can be seen in FIG. 11, in this particular structure there are 12 ribs 209 equiangularly spaced about the axis of shaft 206. By way of example, and not limitation, where the ribs are obligated to support a substantial load flexibly they may be made of a wire having the properties of a common bicycle spoke. In this case, one set of corresponding end portions 210 of the ribs have right angled bends which allows the end portions to fit tightly in holes 211 which are drilled radially through anchoring ring 203. The other corresponding ends 212 fit through a plurality of axial holes 213 in bushing 206. The ends 212 are reentrantly bent so that they overlay the outside of bushing 206. In the FIG. 10 embodiment, the ribs 209 are bowed convexly outwardly by a substantial amount. This is necessary and it imparts to the ribs the capability of bending radially outwardly and inwardly. The ribs may also be bowed convexly inwardly to obtain the same beneficial effects. The spokes allow for the axis of the cylindrical roller 201 to deflect at a small acute angle relative to the axis of shaft 200 to effect uniform tangential line contact between the periphery of roller 201 and another roller, not shown in FIG. 10, which may be driven frictionally by roller 200 as can be demonstrated in the inker of FIG. 1. Having the roller mounted on the plurality of springy axially extending ribs can allow the roller to pitch and yaw in the direction of any roller radius so that the roller will align with a markedly misaligned contacting roller. The self-aligning rotating part mounting cage 202 is not confined to use in rollers such as in FIG. 10. The cage can be used to support other machine parts such as gears where it is important for the teeth on one gear to make line contact with the teeth on the other gear with which the teeth on the one gear mesh. The idea is suggested if one imagines teeth on the outer periphery of roller 201 at its left end in FIG. 10. Of course, in FIG. 10, there would be another cage 202 at the right end of the roller cylinder 201 so the roller is not supported in cantilever fashion. Moreover, if the cage 202 is being used to support a gear, for instance, on shaft 200 the symmetrical type of cage is generally used as suggested in the FIG. 8 embodiment where one set of ribs extends in one axial direction from the bushing on the shaft and another set of ribs extends in the opposite axial direction and the outer ends of both sets of ribs are anchored in rings corresponding to ring 203 in FIG. 10.

Although embodiments of the invention have been described in detail such description is intended to be illustrative rather than limiting, for the invention may be variously embodied and is to be limited only by interpreting the claims which follow.

I claim:

1. For distributing a substance such as ink, the combination of a shaft and a first roller composed of rigid material having an axis of rotation, a device for supporting said roller for rotation about said shaft, said device comprising:

bearing means rotatable and axially slidable on said shaft, a plurality of resilient flexible wire ribs arranged in circumferentially spaced apart relationship about the axis of said bearing means, corresponding one ends of said ribs being attached to said bearing means, and means for fixedly connecting corresponding opposite ends of said ribs to said rotatable roller at a place axially spaced from said bearing means inside of said roller, said ribs each being shaped to be out of contact with said roller between said bearing means and said means for connecting said opposite ends of the ribs to the roller, said ribs being shaped to have a radial component of curvature and an axial component of curvature to provide for said ribs being capable of flexing generally radially relative to the axis of said shaft to allow the axis of said roller to attain a non-parallel relationship with the axis of said shaft, a second roller supported for rotating with its periphery in tangential contact with said first roller along the length of said first roller, the rotational axis of said second roller being out of parallelism with the periphery of said first roller such that contact pressure between said rollers causes said first roller to deflect to establish the periphery of said first roller in said tangential contact along the length of both rollers.

2. The roller according to claim 1 wherein said wire ribs are curved continuously radially inwardly between where said ribs are coupled to said roller and where said ribs are connected to said bearing means.

3. The roller according to claim 1 wherein said wire ribs are curved continuously radially outwardly between where said ribs are attached to said bearing means and where said ribs are connected to said roller.

* * * * *